United States Patent Office 2,972,608
Patented Feb. 21, 1961

2,972,608

PROCESS AND TWO-COMPONENT TRANSITION METAL DIHALIDE CATALYST FOR POLYMERIZING OLEFINS

Harry W. Coover, Jr., and George O. Cash, Jr., Kingsport, Tenn., assignors to Eastman Kodak Company, Rochester, N.Y., a corporation of New Jersey No Drawing. Filed June 19, 1958, Ser. No. 743,024

5 Claims. (Cl. 260—93.7)

This invention relates to the catalytic polymerization of normally gaseous $\alpha$-monoolefins to high molecular weight, highly crystalline solid polymers, and is particularly concerned with the polymerization of aliphatic $\alpha$-monoolefinic hydrocarbons containing 2–10 carbon atoms, either singly or in admixture, to solid high density polymer by means of a single component catalyst.

For many years, ethylene has been polymerized to solid polymers by means of a high-pressure process as disclosed in U.S. 2,153,553 using pressures in excess of 500 atmospheres and usually of the order of 1000–2000 atmospheres. Polyethylene produced in this manner is a solid polymer having a waxy feel, relatively low density and crystallinity, a low softening temperature and great flexibility. More recently, it has been found that polyolefins of increased density and crystallinity could be prepared by catalytic methods which often operated at lower pressure than were necessary in the conventional high-pressure processes. The high-pressure process, while effective for forming solid polyethylene, was wholly ineffective for polymerizing propylene to solid polymer or for polymerizing other higher $\alpha$-olefins to solid polymer. Likewise, many of the catalysts which produced highly crystalline, high density polyethylene of greater rigidity were largely or wholly ineffective for polymerizing propylene and other high $\alpha$-monoolefins to solid polymer and particularly to solid polymer of very high crystallinity.

Among the catalysts employed in low pressure processes for producing polyethylene are organometallic compounds usually in admixture with a compound of a transition element, and specifically triethyl aluminum in admixture with titanium tetrachloride has been suggested for polymerizing ethylene. This specific catalyst combination under most conditions is wholly ineffective for polymerizing the higher $\alpha$-olefins containing at least three carbon atoms to solid polymer, and it has only been in special instances that a catalyst has been found to be highly effective for polymerizing any $\alpha$-olefin containing 2–10 carbon atoms to solid polymer and particularly to highly crystalline polymers such as are desired from the standpoint of high softening temperature and high rigidity. Also, with most catalysts containing organometallic compounds the use of oxygen-containing compounds such as ethers, has usually been avoided because of their deleterious nature.

It is accordingly an object of this invention to provide a new and improved process whereby not only ethylene but also the higher $\alpha$-olefins containing three or more carbon atoms are readily polymerized to high molecular weight, highly crystalline polyolefins.

It is another object of this invention to provide a hitherto unknown catalyst combination which is highly effective for polymerizing ethylene, propylene, and higher $\alpha$-olefins to solid high density polymers of high crystallinity.

Another object of the invention is to polymerize monoolefins to solid polymer using catalysts which may contain ethers and which are effective over an extremely wide temperature and pressure range to produce highly useful results at relatively low pressures and temperatures as compared to the ordinary high-pressure processes.

Other objects will be apparent from the description and claims which follow.

These and other objects are attained by means of this invention wherein it was found unexpectedly that $\alpha$-monoolefinic hydrocarbons containing 2–10 carbon atoms, and particularly the aliphatic $\alpha$-monoolefins containing either a straight or branched chain configuration, could be converted, either singly or in admixture, in excellent yield to high molecular weight, highly crystalline solid polymers by effecting the polymerization in the presence of a catalyst mixture containing a transition metal dihalide and a compound having the formula RX wherein R is selected from the group consisting of lower alkyl radicals containing 1 to 4 carbon atoms and phenyl and X is selected from the group consisting of the halogens and lower alkoxy radicals containing 1 to 4 carbon atoms. The halogen atoms that can be used are selected from the group consisting of chlorine, bromine and iodine. The alkyl radicals include methyl, ethyl, propyl, butyl and the like and the alkoxy radicals include methoxy, ethoxy, propoxy, butoxy and the like. The catalyst embodying this invention not only gives solid polymer of high molecular weight with ethylene as well as the higher monoolefins which is unusual, but also gives the highly crystalline isotactic forms which are particularly desirable for commercial applications. To illustrate the improvement which is achieved by obtaining isotactic or highly crystalline polymers rather than the corresponding atactic or low crystallinity polymers, it should be noted that polyethylene having the highly crystalline form exhibits melting points as high as 137° C. and densities as high as 0.97 whereas the usual atactic polyethylene produced by high-pressure processes softens in boiling water and has a density of the order of 0.91–0.92. Similarly, atactic polypropylene has a melting point of 80° C. and a density of 0.85, whereas isotactic polypropylene has a melting point of about 165° C. and a density of 0.92. This same increase in melting point is evident with the other higher $\alpha$-olefins as is evidenced by the fact that atactic polybutene-1 has a melting point of 62° C. and a density of 0.87 whereas isotactic or highly crystalline polybutene-1 has a melting point of 128° C. and a density of 0.91. The branched chain olefins are particularly useful in producing very high melting polymers when in the highly crystalline isotactic form as evidenced by the fact that poly-3-methyl butene-1 melts above 250° C., isotactic poly-4-methyl pentene-1 melts at temperatures above 210° C., isotactic poly-4-methyl hexene-1 melts at 188° C. and the highly branched poly-4,4-dimethyl pentene-1 melts at temperatures above 300° C. Since these isotactic polymers also have greatly increased strength and stiffness, it can be seen that these polymers are very desirable from the commercial standpoint for use in making sheeting, fibers, molded articles and the like where these increased physical characteristics are of great importance. Thus, the fibers prepared from the highly crystalline polyolefins have unusually high strength and are relatively inert because of their hydrocarbon structure. With high melting points being possible, the use of such polyolefins in applications where higher temperatures are a necessity thus becomes possible when these polymers can be produced commercially by a catalytic process.

The mechanism by which the catalyst composition of this invention functions is not understood, and the invention will not be limited by any theory which might be advanced by way of explanation. It is sufficient to point out that this catalyst is equally effective for polymerizing the higher $\alpha$-olefins which are much more difficultly polymerizable than ethylene which is contrary to the usual experience in olefin polymerization. The polymerization process embodying this invention is carried out in an inert organic liquid vehicle and can be effected at temperatures ranging from 25° C. up to as high as 300° C. or higher and at pressures ranging from atmospheric pressure to very high pressures of the order of 20,000 p.s.i. or higher. The concentration of the catalyst in the vehicle can be varied rather widely with good results being obtained at concentrations of catalyst of from 0.01% to 10% by weight based on the weight of the vehicle. In most cases, the preferred concentration of catalyst is in the range of from about 0.1% to about 1% by weight of catalyst based on the vehicle. Although the polymerization proceeds at room temperature, optimum polymerization results at somewhat higher temperatures, and it is usually desirable to heat the polymerization mixture to a temperature of 70–200° C. in the course of the polymerization. When ethylene is being polymerized, the temperature is desirably in the range of 90–180° C. for best results, although propylene can be polymerized at temperatures of 70–180° C. with equally good results. The higher olefins such as butene-1, 3-methyl butene-1, 4-methyl pentene-1, 4-methyl hexene-1, 5-methyl hexene-1, 4,4-dimethyl pentene-1 and similar high olefins are desirably polymerized at temperatures in excess of 125° C. and generally at 125–200° C. or higher.

The pressure employed in practicing the invention can likewise be varied over very wide limits, and it is necessary only to have a sufficiently high pressure to maintain the vehicle in liquid form during the course of the polymerization and at the temperature employed. Generally, pressures of at least 25 p.s.i. are desirable for optimum results and in many cases, particularly with the higher olefins such as propylene and the like, it is desirable to use pressures of at least 200 p.s.i. Generally, the commercial practice of the invention employs pressures of 25–2000 p.s.i. with pressures of 200–2000 p.s.i. being advantageously used.

The inventive process is carried out in liquid phase in an inert organic liquid vehicle which can be any of the well known inert organic solvents which do not contain combined oxygen. Suitable solvents include the aliphatic hydrocarbons such as propane, pentane, heptane or similar alkanes; the aromatic hydrocarbons such as benzene, toluene or xylene; and halogenated hydrocarbons such as trichloroethylene or chlorobenzene. Petroleum fractions of suitable boiling range such as Stoddard solvent, kerosene or gasoline are also suitable. Thus, any of the well known inert solvents can be used provided the solvent is free of water, alcohol, ether or other compounds containing oxygen. Thus, other materials which are suitable as the vehicle include ethylbenzene, isopropylbenzene, ethyltoluene, n-propylbenzene, diethylbenzenes, mono- and dialkylnaphthalenes, n-octane, isooctane, methylcyclohexane, tetralin, decalin and any of the well-known inert organic liquids. It is sometimes advantageous to use the monomer itself as the vehicle with no solvent present.

The invention is applicable for polymerizing any of the well known α-monoolefinic hydrocarbons, whether straight or branched chained, and is preferably employed for polymerizing the α-monoolefins containing 2–10 carbon atoms. When solid highly crystalline polymer is desired, the invention is preferably employed for polymerizing the straight chain hydrocarbons containing 2–5 carbon atoms such as ethylene, propylene, butene-1 and pentene-1, as well as the branched chain aliphatic α-monoolefins containing 5–10 carbon atoms such as 3-methyl butene-1, 4-methyl pentene-1, 4-methyl hexene-1, 5-methyl hexene-1 and 4,4-dimethyl pentene-1, or the like. If desired, the invention can be used to polymerize other α-olefins, such as allylbenzene, styrene, fluorstyrene, butadiene, isoprene, and the like. The polymers obtained in accordance with this invention have molecular weights greater than 1000 and usually greater than 10,000. The achievement of extremely high molecular weights does not present a problem employing the process herein described, and molecular weights even greater than 1,000,000 can be readily obtained. The polymers embodying the invention usually exhibit crystallinities above 80% as shown by X-ray diagrams and, particularly in the case of polyethylene, crystallinities of above 90% and in many cases of the order of 95% are readily achieved. The polyethylene obtained by means of this invention usually has a density of the order of 0.945 or higher with densities of the order of 0.96 or higher being obtained in many cases. The inherent viscosities as measured in tetralin at 145° C. may be varied from about 0.5 or lower to 5.0 or higher for the polyethylene produced, with melt indices as measured by the standard ASTM method varying from about 0.01 to 20 or higher.

Thus polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection of at least 50,000 p.s.i. The invention also gives correspondingly improved results with the higher polyolefins, and polypropylene obtained by means of the invention has a softening point above 155° C., a density of the order of 0.91 to 0.92, and great strength and stiffness. Similarly, the highly crystalline poly-3-methyl butene-1 has a softening point above 240° C., and the poly-4-methyl pentene-1 has a softening point above 200° C. In similar ways, highly crystalline polybutene-1, polypentene-1 and poly-4,4-dimethyl pentene-1 are obtained which, like the other polymers herein described, exhibit very high crystallinities as shown by the X-ray diffraction patterns. The poly-4,4-dimethyl pentene-1 produced in accordance with this invention softens above 300° C.

The polyolefins prepared in accordance with this invention can be molded or extruded into flexible plates or films. The products can also be extruded to form pipe or tubing of greater rigidity than can be achieved with polymers of lower crystallinity, and they can be injection molded into a great variety of articles. The polymers can also be cold drawn into ribbons, bands, fibers or filaments of high elasticity and improved rigidity. Fibers of extremely high strength can be spun from the molten polymers obtained according to this invention to give fibers having tenacities equal to or greater than the strongest fibers known heretofore. The high melting points and high strengths of the products embodying this invention make them useful for such applications as tire cord, magnetic tape base, photographic film base, and similar applications as well as the usual molding and casting applications. Two or more of the olefins herein described can also be copolymerized to form true copolymers which can be varied over the entire range of physical characteristics by varying the percentage of any component in the mixture being polymerized. Particularly useful copolymers are readily prepared by copolymerizing ethylene and propylene in the range of from 5–95% ethylene to 95–5% propylene.

The polymerization embodying the invention can be carried out batchwise or in a continuous flowing stream process. The process can also be carried out at temperatures below or above the melting point of the polymer being produced as desired. When the polymer has been formed, it is usually desirable to remove the catalyst from the polymeric product, and this can be accomplished by washing the powdered polymer with alcoholic acid or alcoholic base solutions. At temperatures below the melting point of the polymer, the crude polymer is obtained in the form of a finely divided powder which can be readily freed of catalyst. In some cases, particularly when operating at temperatures above the melting point of the polymer, the product may be obtained in the form of relatively large hardened chunks which should be converted to the powdered form prior to the catalyst removal step. This size reduction can be conveniently accomplished by dissolving the polymer in a hot mixture of an aromatic hydrocarbon and an alcohol, such as a mixture of xylene and 2-ethylhexanol, and then re-precipitating the polymer. When a solvent for the polymer at the polymerization temperature is used as vehicle, the hot polymer solution can be filtered before cooling in order to aid the removal of catalyst and consequent production of colorless polymers. The pressure in the polymerization system is readily achieved by pressuring the reactor with the monomer or monomers to be polymerized and continuously adding monomer to the system in order to maintain the pressure at the desired value throughout the course of the polymerization. When a continuous process is employed, a polymerization mixture of constant composition is desirably introduced into the polymerization zone continuously and progressively, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other polymerizable or nonpolymerizable materials such as other α-monoolefins or such materials as hydrogen or saturated hydrocarbons such as methane, ethane or propane. Ordinarily, relatively pure monomers are employed unless copolymers are desired.

The amount of vehicle employed can be varied over rather wide limits relative to this monomer. The concentration of the monomer in the vehicle will depend upon the reaction conditions and will usually range from about 2 to 50% by weight but 100% monomer can be used. For a solution type of process it is preferred to use a concentration from about 2 to about 10% by weight based on the weight of the vehicle, and for a slurry type of process higher concentrations, for example, up to 40% and higher are preferred. Concentrations above 5–10% by weight are ordinarily less desirable, particularly when the polymer dissolves in the reaction medium since this results in a very viscous solution. The polymerization time can be varied as desired from a period of a few minutes or hours to several days. When a continuous process is employed, the temperature is desirably regulated at a relatively constant value, and the contact time in the polymerization zone can also be regulated as desired. In some cases, it is not necessary to employ reaction times much beyond one-half to one hour since a cyclic system can be employed involving precipitation of the polymer and return to the vehicle and unused catalyst to the charging zone wherein the catalyst can be replenished and additional monomer introduced. The polymerization is desirably carried out under such conditions that the vehicle employed is maintained in liquid form during the polymerization.

In practicing this invention catalyst compositions wherein the molar ratios of metal dihalide to compound having the formula RX within the range of 1:2 to 10:1 are preferred, but it will be understood that molar ratios outside these ranges can be used.

The polymerization is ordinarily accomplished by merely admixing the components of the polymerization mixture and raising the temperature until polymerization begins as indicated by a pressure drop in the system when superatmospheric pressure obtained by the monomer charged to the reactor is used. When operating at atmospheric pressure, the olefin can be merely bubbled through the catalyst slurry, although it is desirable to employ elevated pressures so that higher concentrations of monomer in the mixture are obtained and losses of vehicle are minimized. The temperature control of the polymerization process is relatively simple since the solvent vehicle forms a high percentage of the polymerization mixture and hence can be heated or cooled to maintain the temperature as desired.

The invention is illustrated by the following examples of certain preferred embodiments thereof.

*Example 1*

A clean, dry stainless steel autoclave was placed in a nitrogen-filled dry box and charged with 0.5 g. of titanium dichloride and 0.5 g. of phenylethyl ether. The autoclave was connected to a cylinder of ethylene and purged. The temperature was raised to 200° C. and quickly cooled to 90° C. Simultaneously, ethylene was added to maintain the pressure at 300 p.s.i. The autoclave was rocked at 90° C. under 300 p.s.i. of ethylene for 12 hours. When the autoclave was opened after cooling and venting a large mass of polymer was removed from the autoclave. This product was washed with a sulfuric acid solution, ethanol, then water. The final weight of the product was 42 g. This polyethylene had a density of 0.957 and an inherent viscosity of 2.72.

*Example 2*

The procedure of Example 1 was repeated except that propylene was substituted for ethylene, and after the initial heating, the autoclave was cooled to room temperature. To the autoclave containing the catalyst was added 100 ml. of liquid propylene. The temperature was raised to 50° C. and the autoclave was rocked for 12 hours. The yield was 26 g. of polypropylene which had a density of 0.917 and an inherent viscosity of 2.47.

*Example 3*

The procedure of Example 1 was repeated except that the ether was replaced with 0.2 g. of n-butyl chloride and the propylene was replaced by 100 ml. of 3-methyl-1-butene. The polymerization temperature was 150° C. The yield was 27 g. of highly crystalline poly-3-methyl-1-butene.

*Example 4*

Into a clean, dry nitrogen-filled quartz test tube was placed 0.5 g. of titanium dichloride. The test tube was equipped with a ground glass stopper which was connected to a slight nitrogen pressure, and which was provided with an opening sealed by a rubber serum cap. The bottom of the tube was heated by a flame until it glowed. 0.3 g. of bromobenzene was injected through the serum cap onto the hot titanium dichloride. The test tube was plunged immediately into a mixture of solid carbon dioxide and isopropanol. Inside a nitrogen-filled dry box the product of the reaction was transferred to a clean, dry pressure bottle containing 100 ml. of dry heptane. The bottle was connected with a reservoir which contained ethylene at 30 p.s.i.g. The bottle and contents were shaken for 8 hours at 50° C. under 30 p.s.i.g. of ethylene. When the polymerization was stopped, and the bottle opened, a yield of 21 g. of crystalline polyethylene was obtained. The density of the product was 0.956 and the inherent viscosity was 2.68.

*Example 5*

The procedure of Example 4 was repeated except that the reservoir supplying the bottle contained propylene at 30 p.s.i.g. The polymerization temperature was 70° C. The yield was 13 g. of highly crystalline polypropylene having an inherent viscosity of 2.46 and a density of 0.918.

*Example 6*

The procedure of Example 4 was repeated except that 0.6 g. of bromobenzene was used, the monomer was 3-methyl-1-butene, and the polymerization temperature was 90° C. The yield was 8 g. of highly crystalline poly-3-methyl-1-butene.

Example 7

The catalyst was prepared as in Example 4 and transferred to a 3-l. flask. The flask was equipped with a stirrer, reflux condenser, dropping funnel, and heating mantle. In addition to the catalyst, the flask contained 1,500 ml. of dry heptane. The stirrer was started and the contents of the flask were heated to 90° C. From the dropping funnel was added dropwise 200 ml. of 4-methyl-1-pentene. At the end of the run the contents of the flask were filtered while still hot. The yield was 47 g. of highly crystalline poly-4-methyl-1-pentene.

Example 8

The procedure of Example 7 was repeated except that the monomer was 200 ml. of allyl benzene. The yield was 44 g. of highly crystalline poly-(allyl benzene).

The invention thus provides a method whereby not only ethylene but also the higher aliphatic α-monoolefins are readily polymerized to solid high molecular weight polymers exhibiting the high crystallinity characteristic of isotactic polymers. By means of this invention, a wide variety of polyolefins can be readily prepared using the same catalyst, and the catalyst is suitable not only for forming the homopolymers but also copolymers of the various monomers defined herein.

The polymers thus obtained can be extruded, mechanically milled, cast or molded as desired. The polymers are sometimes particularly valuable as blending agents with the relatively more flexible atactic polymers such as high-pressure polyethylene to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in detail with reference to certain preferred embodiments thereof, variations and modifications can be effected within the spirit and scope of the invention as described hereinabove and as defined in the appended claims.

We claim:

1. The method of polymerizing an α-monoolefinic hydrocarbon selected from the group consisting of ethylene and propylene to solid polymer of high crystallinity and high density which comprises contacting said olefinic hydrocarbon with a catalytic mixture consisting essentially of titanium dichloride and phenylethyl ether in a molar ratio within the range of 1:2 to 10:1.

2. As a composition of matter a polymerization catalyst consisting essentially of titanium dichloride and phenylethyl ether in a molar ratio of 1:2 to 10:1.

3. In the polymerization of an α-monoolefinic hydrocarbon containing 2 to 10 carbon atoms, the improvement in forming highly crystalline polymer which comprises effecting the polymerization in the presence of a catalytic mixture consisting essentially of a titanium dihalide, the halogen being selected from the group consisting of chlorine, bromine and iodine and an ether compound having the formula RX wherein R is selected from the group consisting of lower alkyl radicals containing 1 to 4 carbon atoms and phenyl and X is a lower alkoxy radical containing 1 to 4 carbon atoms, the molar ratio of titanium dihalide to RX compound being from 1:2 to 10:1.

4. In the polymerization of an aliphatic α-monoolefinic hydrocarbon containing 2 to 10 carbon atoms, the improvement in forming highly crystalline polymer which comprises effecting the polymerization in an organic liquid vehicle and in the presence of a catalytic mixture consisting essentially of a titanium dihalide, the halogen being selected from the group consisting of chlorine, bromine and iodine and an ether compound having the formula RX wherein R is selected from the group consisting of lower alkyl radicals containing 1 to 4 carbon atoms and phenyl and X is a lower alkoxy radical containing 1 to 4 carbon atoms, the molar ratio of titanium dihalide to RX compound being from 1:2 to 10:1.

5. As a composition of matter, a polymerization catalyst consisting essentially of a titanium dihalide, the halogen being selected from the group consisting of chlorine, bromine and iodine and an ether compound having the formula RX wherein R is selected from the group consisting of lower alkyl radicals containing 1 to 4 carbon atoms and phenyl and X is a lower alkoxy radical containing 1 to 4 carbon atoms, the molar ratio of titanium dihalide to RX compound being from 1:2 to 10:1.

References Cited in the file of this patent

UNITED STATES PATENTS

| | | |
|---|---|---|
| 2,827,447 | Nowlin et al. | Mar. 18, 1958 |
| 2,840,551 | Field | June 24, 1958 |
| 2,843,577 | Friedlander | July 15, 1958 |

FOREIGN PATENTS

| | | |
|---|---|---|
| 777,538 | Great Britain | June 26, 1957 |
| 778,639 | Great Britain | July 10, 1957 |
| 790,399 | Great Britain | Feb. 5, 1958 |
| 1,135,808 | France | Dec. 22, 1956 |
| 1,134,740 | France | Dec. 3, 1956 |
| 1,153,323 | France | Sept. 30, 1957 |

UNITED STATES PATENT OFFICE
CERTIFICATION OF CORRECTION

Patent No. 2,972,608

February 21, 1961

Harry W. Coover, Jr., et al.

It is hereby certified that error appears in the above numbered patent requiring correction and that the said Letters Patent should read as corrected below.

Column 1, line 57, for "compunds" read -- compounds --; column 5, line 57, for "to" read -- of --; column 8, line 19, after "an" insert -- inert --.

Signed and sealed this 15th day of August 1961.

(SEAL)
Attest:

ERNEST W. SWIDER
Attesting Officer

DAVID L. LADD
Commissioner of Patents